United States Patent Office 2,861,989
Patented Nov. 25, 1958

2,861,989

NEW PHOTO-SENSITIZING DYESTUFFS CONTAINING A TETRAHYDROQUINAZOLINE GROUP

Ludwig Wilhelm Berlin and Paul Heimke, Frankfurt am Main, Germany, assignors to Farbwerke Hoechst Aktiengesellschaft vormals Meister Lucius & Brüning, Frankfurt am Main, Germany, a corporation of Germany No Drawing. Application January 24, 1956
Serial No. 561,161

Claims priority, application Germany January 29, 1955

4 Claims. (Cl. 260—240.4)

The present invention relates to new photo-sensitizing dyestuffs of the cyanine, styryl and merocyanine series, more particularly it relates to dyestuffs corresponding to the following general formulae

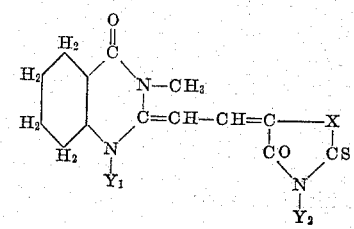

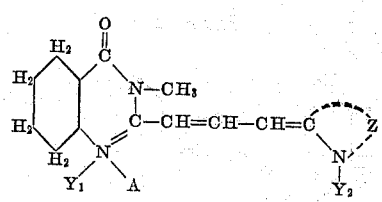

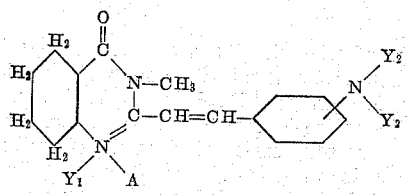

wherein A represents a negative radical of an inorganic acid, X stands for O, S or N-alkyl, $Y_1$ and $Y_2$ stand for lower alkyls and Z represents the atoms necessary to complete a heterocyclic ring system.

It is known to prepare photo-sensitizing dystuffs of the cyanine, styryl or merocyanine series from the quaternary salts of heterocyclic bases, the so-called cyclammonium compounds. These compounds are condensed according to known methods with, for example, ortho-alkyl esters of aliphatic carboxylic acids or with dialkylamino-benzaldehydes or with methylene-omega-aldehydes of the heterocyclic series or with the intermediate compounds which are formed in the synthesis of these aldehydes. For the preparation of the dyestuffs, heterocyclic bases containing an acetanilido-methylene group and corresponding to the following general formula may also be used:

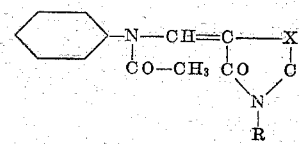

wherein X stands for O, S, Se or N-alkyl and R represents an alkyl group. When starting from the methylene-omega-aldehyde compounds of the heterocyclic series, in addition to the already mentioned condensation of these aldehydes with cyclammonium compounds, there may also be considered, for example, the condensation of these aldehydes or the intermediate compounds formed in the synthesis of these aldehydes with heterocyclic bases containing a methylene group capable of reacting.

For the preparation of the so-called monomethine cyanines there are used, instead of the above methylene-omega-aldehydes, the 2-alkyl-mercapto compounds of heterocyclic bases corresponding to the following general formula:

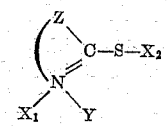

wherein $X_1$ and $X_2$ represent alkyl groups, Y represents an inorganic acid radical and Z represents the atomic grouping necessary to complete a heterocyclic ring system.

Now we have found that valuable new photo-sensitizing dyestuffs of the cyanine, styryl and merocyanine series are obtained by using in the known processes described above as cyclammonium compounds quaternary salts which are derived from tetrahydroquinazolinones and correspond to the following general formula:

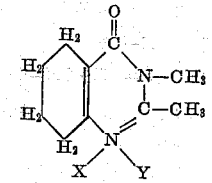

wherein X represents an alkyl group and Y stands for an inorganic acid radical.

These compounds which have not been described in literature may be prepared by methylating 2-methyl-5.6.7.8-tetrahydroquinazolinol-(4), which can be obtained according to the statements in the "Journal of the American Chemical Society," volume 74 (1952), page 842, and subsequently quaternating by known methods the 2.3-dimethyl-5.6.7.8-tetrahydroquinazolinone-(4) so obtained. During the methylation which takes place in the presence of caustic alkali in alcohol, the enol form of the base, the tetrahydroquinazolinol, is probably transformed into the keto form, the corresponding tetrahydroquinazolinone, according to the following reaction scheme:

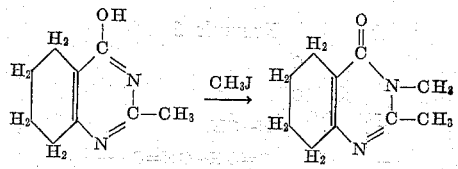

The 2.3 - dimethyl - 5.6.7.8 tetrahydroquinazolinone-(4) can be obtained in the following manner:

49 grams of 2-methyl-5.6.7.8-tetrahydroquinazolinol-(4) and 43 grams of methyl iodide are added to a solution of 17 grams of caustic potash in 270 cc. of absolute ethanol and the mixture is boiled for 5 hours under reflux. After the reaction mixture has been allowed to cool, the potassium iodide which has formed is filtered off with suction, washed with absolute alcohol, and the alcohol is distilled off from the filtrate. The residue is dissolved in benzene, filtered from small quantities of residual potassium iodide and the benzene is then distilled under reduced pressure. The colorless crystalline residue is dried on clay. The quinazolinone so obtained melts at 108° C. to 109° C.

The 2.3-dimethyl-5.6.7.8-tetrahydroquinazolinone-(4) can be transformed into its quaternary salts, for example into the iodomethylate, in the following manner: 35.6 grams of 2-methyl-5.6.7.8-tetrahydroquinazolinone-(4) are heated in a sealed tube at 100° C. for 15 hours with 29 grams of methyl iodide. The cooled mass is then stirred with a mixture of ethyl acetate and acetone in the proportion of 1:1, the hygroscopic iodomethylate is filtered off with suction, washed with acetone and dried under reduced pressure at 40° C. to 50° C. The iodomethylate obtained in a good yield melts at 156° C.

The new dyestuffs are especially suitable for the sensitization of silver chloro-bromide emulsions, especially in the orthochromatic zone. The dyestuffs also serve to increase the spectral self-sensitivity of the silver halide emulsions commonly used, depending on the spectral position of their sensitization zone, and are distinguished in general by a good intensity. Furthermore, many of the dyestuffs obtainable by the present invention effect no or only a very slight coloration of the layer in the sensitization of photographic papers, an advantage much appreciated by the photographic industry. The new dyestuffs, therefore, constitute a valuable advance in the art of sensitization.

The following examples serve to illustrate the invention, but they are not intended to limit it thereto:

*Example 1*

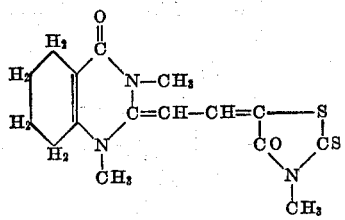

1.78 grams of 2.3-dimethyl-5.6.7.8-tetrahydroquinazolinone-(4) are heated with 1.86 grams of p-toluene sulfonic acid methyl ester at 120° C. to 130° C. for one hour. The cooled reaction product and 2.92 grams of 5-acetanilidomethylene-N-methyl-rhodanine are then dissolved successively in 50 cc. of absolute ethanol. After the addition of 2.8 cc. of triethylamine, the solution is heated at the boil for 40 minutes under a reflux condenser. After the solution has been allowed to cool and stand for a prolonged time, the dyestuff is filtered off with suction, washed with methanol and recrystallized from methanol in the usual manner. The dyestuff obtained in the form of lustrous red crystals melts at 186° C. to 187° C. The dyestuff produces a sensitization maximum at about 5630 Angström.

*Example 2*

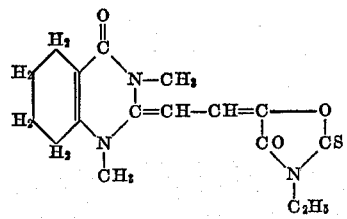

3.56 grams of 2.3-dimethyl-5.6.7.8-tetrahydroquinazolinone-(4) and 3.72 grams of p-toluene sulfonic acid methyl ester are heated at 120° C. to 130° C. for one hour. The cooled quaternary compound is then dissolved in 60 cc. of absolute ethanol. 5.8 grams of 5-acetanilido-methylene-N-ethyl-oxazolidone are added to this solution which, after the addition of 2.8 cc. of triethylamine, is heated at the boil for 20 minutes under a reflux condenser. The dyestuff which has separated in the cold is filtered off with suction, washed with methanol and recrystallized from methanol. The sensitizer forms fine, orange-colored small needles which melt at 225° C. The dyestuff produces a sensitization maximum at about 5180 Angström.

*Example 3*

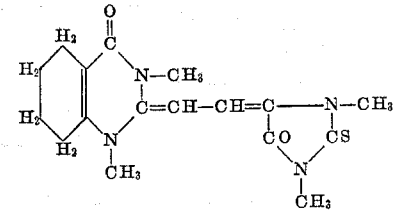

1.2 grams of 2.3 dimethyl-5.6.7.8-tetrahydroquinazolinone-(4) and 1.3 grams of p-toluene sulfonic acid methyl ester are heated at 110° C. to 120° C. for one hour. The quaternary compound so obtained is then dissolved in 25 cc. of absolute ethanol, 2 grams of 5-acetanilidomethylene-1.3-dimethyl-2-thiohydantoin and 1.7 cc. of triethylamine are added and the solution is heated at the boil for 40 minutes. The dyestuff of the above constitution is obtained in a good yield. The claret-colored crystals are filtered off with suction in the cold, washed with methanol and purified by recrystallization from methanol. The dyestuff obtained in the form of claret, lustrous fine needles melts at 195° C. to 196° C. It produces a sensitization maximum at about 5430 Angström.

*Example 4*

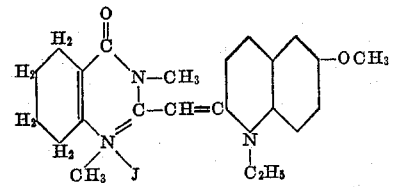

1.4 cc. of triethylamine are added to a solution of 3.75 grams of 2-ethylthio-6-methoxyquinoline-iodoethylate and 3.2 grams of 2.3-dimethyl-5.6.7.8-tetrahydroquinazolinone-(4)-iodomethylate in 20 cc. of absolute ethanol. The solution is boiled on the steam bath under a reflux condenser for one hour. The dyestuff which has crystallized from the cooled reaction mixture is filtered off with suction, washed with methanol and then recrystallized twice from methanol. The pure dyestuff crystallizes in the form of lustrous, orange-colored fine prisms which melt at 226° C. It produces a sensitization maximum at about 4800 Angström.

*Example 5*

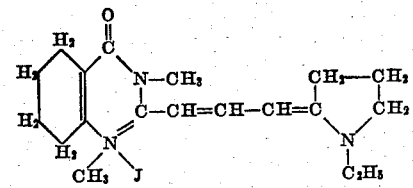

3.2 grams of 2.3-dimethyl-5.6.7.8-tetrahydroquinazolinone-(4)-iodomethylate and 1.39 grams of N-ethylpyrrolidine-2-methylene-omega-aldehyde are dissolved in 10 cc. of pyridine. 1 cc. of acetic anhydride is added at room temperature and the mixture is stirred for one hour at the same temperature. After the mixture has been allowed to stand for some time, part of the dyestuff is filtered off with suction. Ether is then added to the liquor, whereby another part of the dyestuff precipitates which is triturated with a small quantity of acetone and filtered off with suction. The total amount of the crude dyestuff is recrystallized twice from methanol. The dyestuff obtained in a good yield in the form of fine, felted small needles having a golden-yellow color melts at 186° C. to 187° C. It produces a sensitization maximum at about 4750 Ångström.

*Example 6*

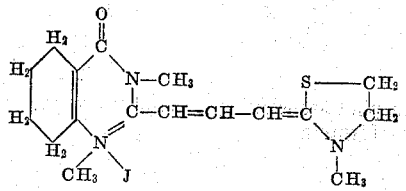

A solution of 3.2 grams of 2.3-dimethyl-5.6.7.8-tetrahydroquinazolinone-(4)-iodomethylate and 2.18 grams of 2-phenyliminoethylidene-N-methylthiazolidine in 20 cc. of pyridine is mixed with 1 cc. of acetic anhydride and stirred at room temperature for one hour. The dyestuff so obtained is then filtered off with suction and purified by recrystallization from methanol. The purified sensitizer crystallizes in the form of scarlet-colored small needles which melt at 175° C. to 176° C. This dyestuff produces a sensitization maximum at about 4850 Ångström.

*Example 7*

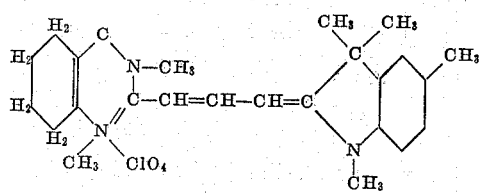

The dystuff of the above constitution is obtained in a good yield, when 6.4 grams of 2.3-dimethyl-5.6.7.8-tetrahydroquinazolinone-(4)-iodomethylate and 4.3 grams of 1.3.3.5 - tetramethylindoline - 2 - methylene - omega-aldehyde are dissolved in 20 cc. of pyridine, 2 cc. of acetic anhydride are added and the solution is stirred at room temperature for one hour. Ether is then added to the solution and decanted after the solution has been allowed to stand for some time. The dyestuff is dissolved in 30 cc. of methanol and the crude product is converted into the perchlorate in the usual manner. After some time, the crude product so obtained is filtered off with suction and recrystallized from methanol. The dyestuff forms fine claret-colored crystals which melt at 157° C. to 158° C. It produces a sensitization maximum at about 5040 Ångström.

*Example 8*

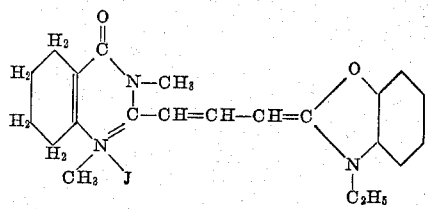

3.2 grams of 2.3 dimethyl-5.6.7.8-tetrahydroquinazolinone-(4)-iodomethylate and 2.64 grams of N-ethyl-2-phenyliminoethylidene-benzoxazoline are dissolved in 20 cc. of pyridine. The solution is cooled to 5° C. and 1 cc. of acetic anhydride is introduced into the solution. The reaction mixture is stirred at room temperature for one hour, the dyestuff is filtered off with suction and purified by recrystallization from methanol. It is obtained in the form of fine, red crystals which melt at 205° C. and produces a sensitization maximum at about 5050 Ångström.

*Example 9*

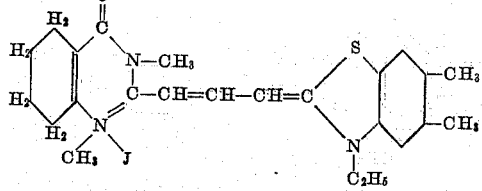

1 cc. of acetic anhydride is added at room temperature to a solution of 3.2 grams of 2.3-dimethyl-5.6.7.8-tetrahydroquinazolinone-(4)-iodomethylate and 4.1 grams of N - ethyl - 5.6 - dimethyl - 2 - phenyliminoethylidene-benzthiazoline in 25 cc. of pyridine and the solution obtained is stirred at room temperature for one hour. The sensitizer obtained in a good yield is filtered off with suction and purified by recrystalization from methanol. The dyestuff obtained in the form of a claret-colored crystal powder melts at 233° C. with decomposition. It produces a sensitization maximum at about 5600 Ångström.

The dyestuff can also be prepared in the following manner: 1 cc. of acetic anhydride is added at room temperature to a solution of 3.33 grams of 2.5.6-trimethyl-benzthiazol-iodoethylate and 2.95 grams of 1.3-dimethyl-1.2.5.6.7.8 - hexahydro - 2 - phenylimino-ethylidene-quinazolinone-(4) in 25 cc. of pyridine and the solution is stirred at the same temperature for one hour. After the crude product has been filtered off with suction and purified by recrystallization from methanol, the dyestuff of the above constitution is obtained. The 1.3-dimethyl-1.2.5.6.7.8 - hexahydro - 2 - phenylimino - ethylidenequinazolinone-(4) can be obtained in the following manner: 16 grams of 2.3-dimethyl-5.6.7.8-tetrahydroquinazolinone-(4)-iodomethylate and 11 grams of diphenylformamidine are mixed with 10 cc. of acetic anhydride and then heated to 50° C., 4 cc. of glacial acetic acid are added and the mixture is stirred for one hour at 50° C. After the reaction mixture has been allowed to cool, it is stirred with 40 cc. of ethyl acetate and the intermediate product of the following probable formula

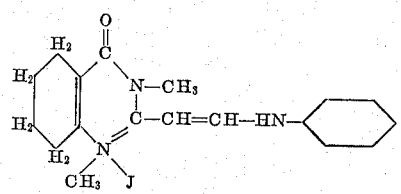

is filtered off with suction. After recrystallization from methanol, it melts at 215° C. to 216° C. In order to convert this compound into the 1.3-dimethyl-2-phenyliminoethylidene - 1.2.5.6.7.8 - hexahydroquinazolinone-(4), 8.4 grams of 3-methyl-2-anilinovinyl-5.6.7.8-tetrahydroquinazolinone-iodomethylate are suspended in 20 cc. of acetone, 40 cc. of water and 20 cc. of 2 N sodium hydroxide solution are added and this suspension is stirred for 45 minutes at 40° C. to 50° C. 200 cc. of water are then poured into the suspension, and the quinazolinone derivative of the following formula

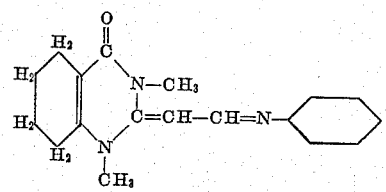

which is obtained in a good yield is filtered off with suction. After recrystallization from a mixture of ethyl acetate and cyclohexane it melts at 97° C. to 98° C.

Example 10

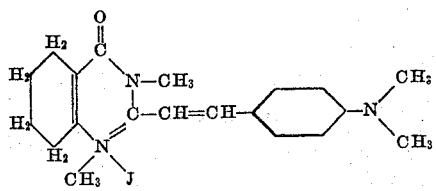

A mixture of 3.2 grams of 2.3-dimethyl-5.6.7.8-tetrahydroquinazolinone-(4)-iodomethylate and 1.49 grams of p-dimethyl-amino-benzaldehyde is dissolved in 15 cc. of pyridine, 2 cc. of acetic anhydride are added at 10° C. and the mixture is heated at 60° C. to 70° C. for one hours. After cooling, the dyestuff solution is poured into 100 cc. of petrol ether. After decanting, the residue is triturated with a small quantity of acetone, the crystals are filtered off with suction and purified by recrystallization from methanol. The sensitizer obtained in the form of orange-colored crystals melts at 183° C. to 184° C. and has an absorption maximum of about 4700 Angström.

We claim:

1. Photo-sensitizing dyestuffs having the general formula:

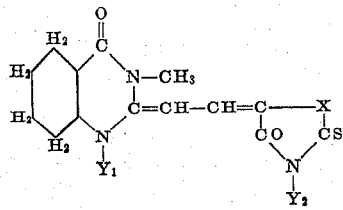

wherein X stands for a member selected from the group consisting of O, S and N-alkyl, and $Y_1$ and $Y_2$ stand for lower alkyl groups.

2. The photo-sensitizing dyestuff corresponding to the following formula

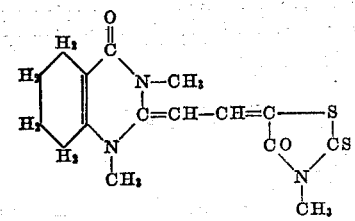

3. The photo-sensitizing dyestuff corresponding to the following formula

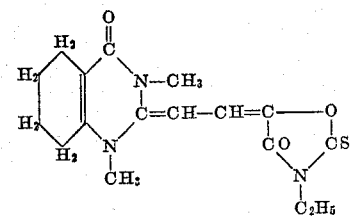

4. The photo-sensitizing dyestuff corresponding to the following formula

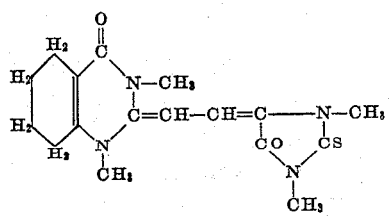

References Cited in the file of this patent

Bogert et al.: J. Am. Chem. Soc., vol. 46, pages 1296–1298 (1924).